US011360499B2

(12) United States Patent
Santos

(10) Patent No.: US 11,360,499 B2
(45) Date of Patent: Jun. 14, 2022

(54) INTEGRATED SYSTEM FOR CONTROL, SUPERVISION AND MONITORING OF POWER TRANSFORMERS EQUIPPED WITH TAP SWITCHES UNDER LOAD

(71) Applicant: Eduardo Pedrosa Santos, Atibaia (BR)

(72) Inventor: Eduardo Pedrosa Santos, Atibaia (BR)

( * ) Notice: Subject to any disclaimer, the term of this patent is extended or adjusted under 35 U.S.C. 154(b) by 0 days.

(21) Appl. No.: 16/631,249

(22) PCT Filed: Dec. 10, 2018

(86) PCT No.: PCT/BR2018/050452
§ 371 (c)(1),
(2) Date: Jan. 15, 2020

(87) PCT Pub. No.: WO2019/134021
PCT Pub. Date: Jul. 11, 2019

(65) Prior Publication Data
US 2020/0218297 A1    Jul. 9, 2020

(30) Foreign Application Priority Data
Jan. 8, 2018 (BR) .......................... 10 2018 000375

(51) Int. Cl.
| | |
|---|---|
| *H02M 1/14* | (2006.01) |
| *G05F 1/147* | (2006.01) |
| *H02P 13/06* | (2006.01) |
| *G05B 13/02* | (2006.01) |

(52) U.S. Cl.
CPC .............. *G05F 1/147* (2013.01); *H02P 13/06* (2013.01); *G05B 13/02* (2013.01)

(58) Field of Classification Search
CPC . G05F 1/47; G05F 1/147; H02P 13/06; G05B 13/02; H02B 1/26; H02B 1/30; H05K 5/00; H05K 5/0004
See application file for complete search history.

(56) References Cited

U.S. PATENT DOCUMENTS

| | | | |
|---|---|---|---|
| 2,820,953 A | 1/1958 | Cuthbertson | |
| 2005/0099741 A1* | 5/2005 | Stenestam | G01R 31/333 361/1 |
| 2007/0001793 A1* | 1/2007 | Magnier | H01F 27/14 336/90 |
| 2012/0064746 A1 | 3/2012 | Bellows et al. | |
| 2020/0393521 A1* | 12/2020 | Bayoumi | G01D 21/02 |
| 2021/0151235 A1* | 5/2021 | Ndiaye | H01F 29/025 |

OTHER PUBLICATIONS

EPODOC, ESPACENET in connection with PCT/BR2018/050452 filed Dec. 10, 2018, "International Search Report", 2 pages, dated Jan. 10, 2019.

* cited by examiner

*Primary Examiner* — Adolf D Berhane
(74) *Attorney, Agent, or Firm* — McKee, Voorhees & Sease, PLC

(57) ABSTRACT

This consists of a system capable of integrating all the control, supervision and monitoring functions of power transformers (2) equipped with on-load tap changers bringing benefits such as design simplifications, manufacturing simplifications, reductions in manufacturing costs, optimization and reduction of maintenance costs, and increased reliability of the transformer, which is promoted to the category of intelligent transformer, ready for the Industrial Internet of Things (IIoT) and Smart Grids.

1 Claim, 8 Drawing Sheets

INTEGRATED SYSTEM FOR CONTROL, SUPERVISION AND MONITORING OF POWER TRANSFORMERS EQUIPPED WITH TAP SWITCHES UNDER LOAD

CROSS REFERENCE TO RELATED APPLICATIONS

This is a U.S. National Phase application claiming priority to PCT/BR2018/050452, filed Dec. 10, 2018, which claims priority to Brazilian application No. BR 10 2018 000375 5, filed Jan. 8, 2018, the entire contents of which are hereby expressly incorporated by reference in their entirety including, without limitation, the specification, claims, and abstract, as well as any figures, tables, or drawings thereof.

INTRODUCTION

This patent application concerns an original system capable of integrating, into a single enclosure, all the functions of control, supervision and monitoring of power transformers equipped with on-load tap changers. This integration of functions allows for simplifications both in the design and construction of systems for the control, supervision and monitoring of the transformers, producing several practical and operational advantages in relation to the state of the art.

FIELD OF APPLICATION

Power transformers are used in power plants and electrical energy transmission and distribution substations.

STATE OF THE ART

Power transformers are commonly equipped with an accessory called an on-load tap changer, which is an electromechanical device whose main function is the regulation of the electrical voltage supplied at the transformer output.

This regulation is performed by altering the tap of the transformer winding that is effectively connected to the electrical circuit, a change that is made by means of a drive mechanism that is housed inside a metal enclosure, called the changer mechanism enclosure, which protects it from the weather. This drive mechanism consists of the following main parts: an electric motor, several mechanical gears, power switches driven by cams and a control circuit that receives local or remote commands to sequentially change the connected tap. For example, in a transformer that has a total of 33 taps, the on-load tap changer may currently be in the position of tap 17; when it receives a command to "lower the tap", the control circuit energizes the electric motor, which in turn triggers the gears in order to change the position of the tap from 17 to 16; then, if a command is received to "raise the tap", the control circuit again energizes the electric motor, but now in the opposite direction, in order to change the position of the tap from 16 to 17.

Furthermore, power transformers also have a second metal enclosure, called the supervision and control enclosure, inside which are housed:

The electrical power and control circuits that drive the electric motors of the fans and/or oil circulation pumps used for forced cooling of the transformer;

The electronic devices for online monitoring of the state of the transformer, such as the monitors of the oil temperature and the transformer windings, the monitors of humidity dissolved in the oil, the monitors of gas dissolved in oil, the monitors of the dielectric state of the capacitive bushings, the torque monitor of the motor of the on-load tap changer, etc.;

The electronic devices for controlling the on-load tap changer, such as automatic voltage regulating relay, digital control of the parallel operation of the transformers, etc.;

The connection terminals (connectors) where all the signals from the drive mechanism enclosure of the on-load tap changer are connected, such as the command signals for "raising the tap" and "lowering the tap", the various signals for indicating the status of the on-load tap changer (current tap position, minimum or maximum on-load tap changer, local or remote changer control, protective circuit breaker of the disconnected motor, etc.);

The connectors where all the signals from the auxiliary transformer protection and supervision devices are connected, such as the alarm and/or shutdown contacts of the pressure relief valve, of the gas accumulation relay (Buchholz relay), the transformer oil level indicator, the on-load tap changer oil level indicator, the overpressure relay of the on-load tap changer, etc.;

The connectors where all the signals of the secondary windings of the measuring and/or protection CTs (current transformers) are connected.

Thus, in the current state of the art the power transformers equipped with an on-load changer have two separate control enclosures:

A changer mechanism enclosure for housing the drive mechanism of the on-load tap changer and its control circuit, and a supervision and control enclosure that serves to house all the other control, supervision, protection and monitoring circuits of the transformer. Additionally, the latter enclosure possesses connectors for receiving all the command signals for status signaling from the drive mechanism enclosure of the changer, so that all the interfaces of the transformer with the external environment are concentrated in this enclosure.

PRINCIPAL DISADVANTAGES OF THE STATE OF THE ART

With the control, supervision and monitoring functions of the transformer divided into two separate locations, it is difficult to train the operations and maintenance technicians, and for them to execute their tasks on a daily basis. For example, to operate the forced cooling control system, the technician must go to the supervision and control enclosure, while to operate the control system of the on-load changer they must go to the changer mechanism enclosure.

The existence of two enclosures results in greater use of space on the sides of the transformer, which in many cases hinders the mechanical design and the manufacture of the transformer.

The existence of two enclosures results in greater complexity of the design of the control, supervision and monitoring of the transformer, and in higher manufacturing costs for these enclosures and, consequently, a higher total production cost of the transformer.

The need to concentrate all the transformer interfaces with the external environment in only one of the enclosures causes all the connectors in the changer mechanism enclosure to be duplicated in the supervision and control enclosure, with the use of a large quantity of electrical cables to connect the connectors of one enclosure to those of the other. This results in increased materials costs, longer manufacturing times for the transformer, greater difficulties with maintenance and increased risk of failures, because the duplication of the number of electrical connection points proportionally increases the risk of bad contacts.

The existence of two enclosures causes auxiliary support systems to be duplicated for them, including lamps and lighting switches, thermostats and anti-condensation heaters, auxiliary sockets, auxiliary mini-circuit breakers, etc.

OBJECTIVES OF THE INVENTION

It is the objective of this invention with the integration of enclosures, to offer greater ease and practicality in the training of operation and maintenance technicians, and in the everyday execution of their tasks. For illustrative purposes which in no way limit the facility provided, both the forced cooling control system and the on-load changer control system are operated in the integrated changer mechanism enclosure.

It is the objective of this invention with integration of the enclosures, to provide a larger free area on the side faces of the transformer, which in many cases facilitates the mechanical design and manufacture of the transformer.

It is the objective of this invention with integration of the enclosures, to render less complex the design of the control, supervision and monitoring of the transformer.

It is the objective of this invention with integration of the enclosures, to reduce the manufacturing costs of the control, supervision and monitoring enclosures of the transformers and, consequently, to lower the total cost of the production of the transformer.

It is the objective of this invention with integration of the enclosures, to concentrate all the transformer interfaces with the external environment in a single point/enclosure, thus dispensing with the need for the duplication of the connectors of the changer mechanism enclosure and eliminating a large quantity of electrical cables that would be used to connect the connectors of one enclosure with those of the other. As a result, lower materials costs, shorter transformer manufacturing times, greater ease of maintenance and a lower risk of failures due to bad contacts at the electrical connection points are obtained.

It is the objective of this invention with the integration of the enclosures, to eliminate the duplication of auxiliary enclosure support systems, which include lamps and lighting switches, thermostats and anti-condensation heaters, auxiliary sockets, auxiliary mini-circuit breakers, etc.

It is the objective of this invention with integration of enclosures, to promote the transformer to the category of intelligent equipment, ready for the Industrial Internet of Things (IIoT) and Smart Grids, since it provides the transformer with self-monitoring functionalities capable of indicating, in advance, the development of defective conditions in the transformer or in the on-load tap changer. This reduces maintenance costs and the risks of equipment failures and a lack of electricity.

ABSTRACT OF THE INVENTION

The INTEGRATED POWER, CONTROL, SUPERVISION AND MONITORING SYSTEM FOR POWER TRANSFORMERS EQUIPPED WITH ON-LOAD TAP CHANGERS comprises the integration into a single enclosure, i.e. in the enclosure of the integrated changer mechanism, of all the control, supervision and monitoring functions of power transformers equipped with on-lap tap changers.

DESCRIPTION OF THE FIGURES

The figures below are presented to better explain the patent application illustratively and non-limitingly.

DETAILED DESCRIPTION OF THE INVENTION

Figure 1:
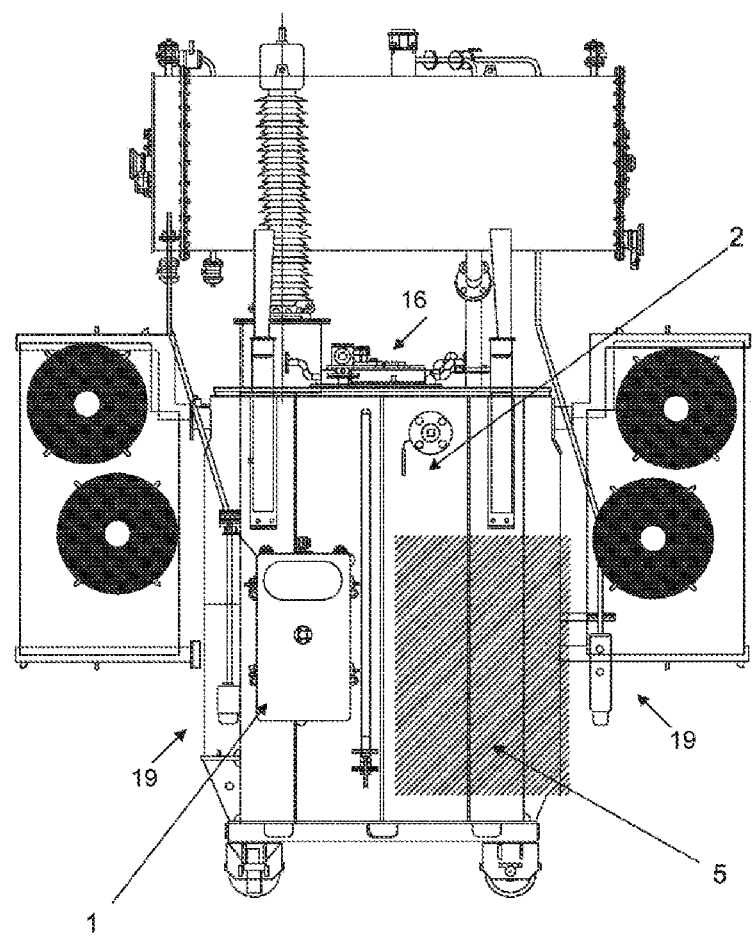
FIG. 1: Front view of a transformer equipped with the enclosure of the integrated control, supervision and monitoring system, with hatched detail.
Figure 2:
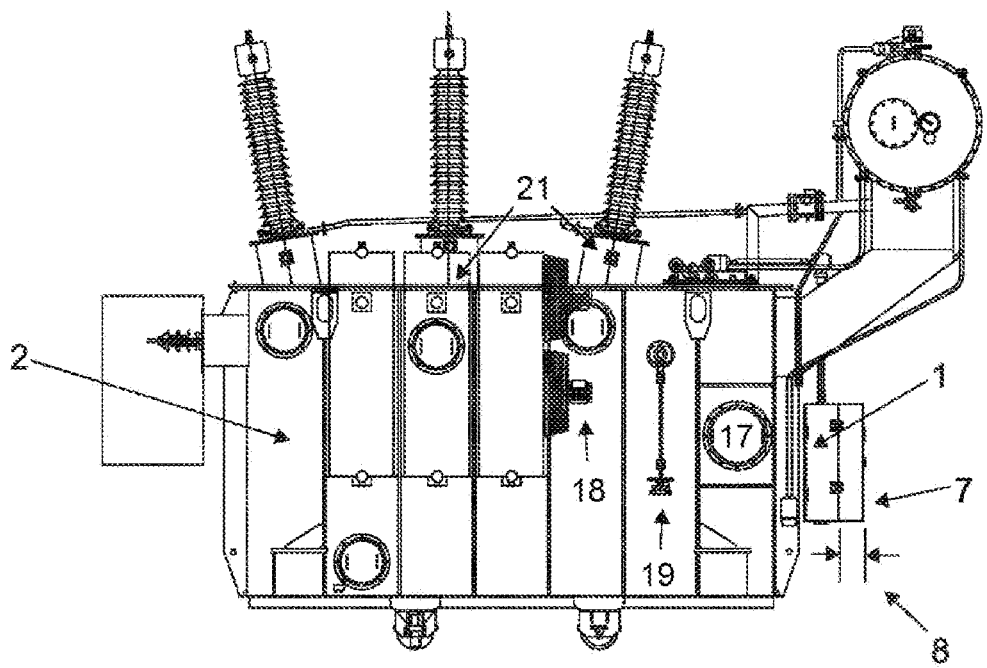
FIG. 2: Side view of a transformer equipped with the enclosure of the integrated control, supervision and monitoring system.
Figure 3:
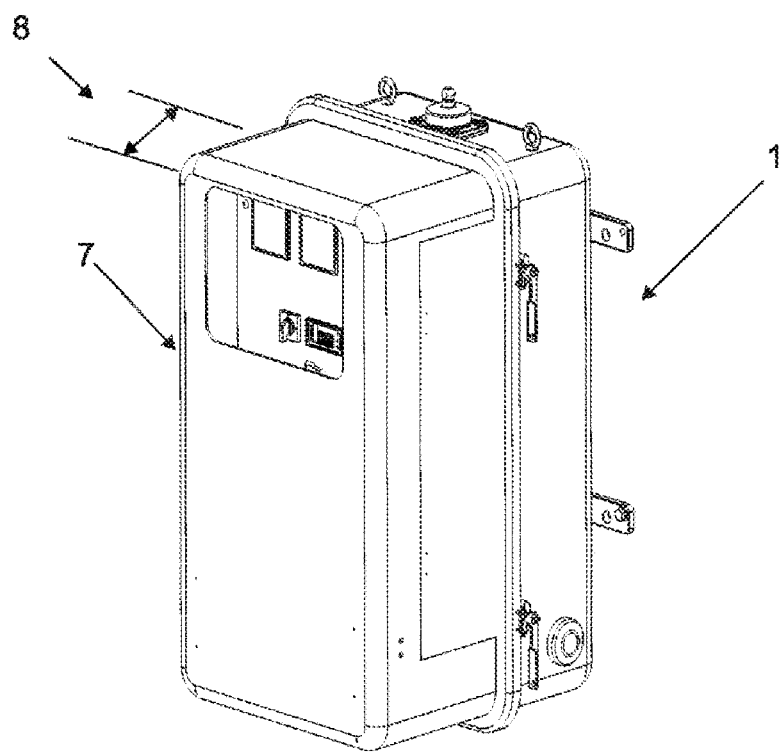
FIG. 3: Perspective view of the enclosure of the integrated control, supervision and monitoring system.
Figure 4:
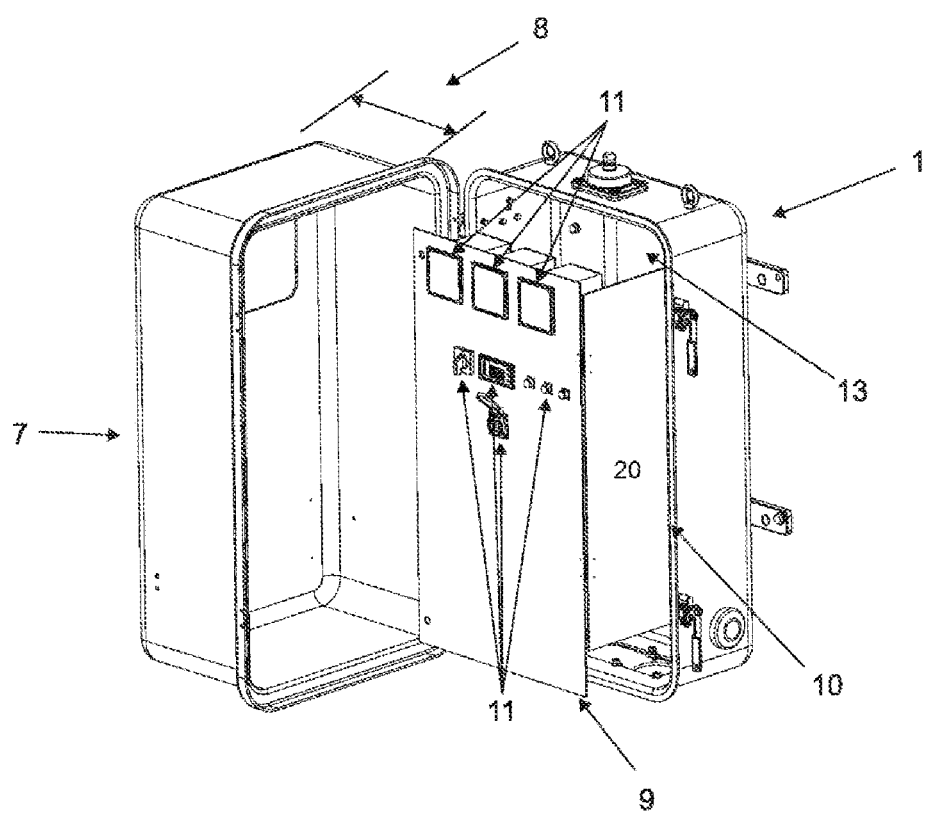
FIG. 4: Perspective view of the enclosure of the integrated control, supervision and monitoring system, shown with the external door open.
Figure 5:
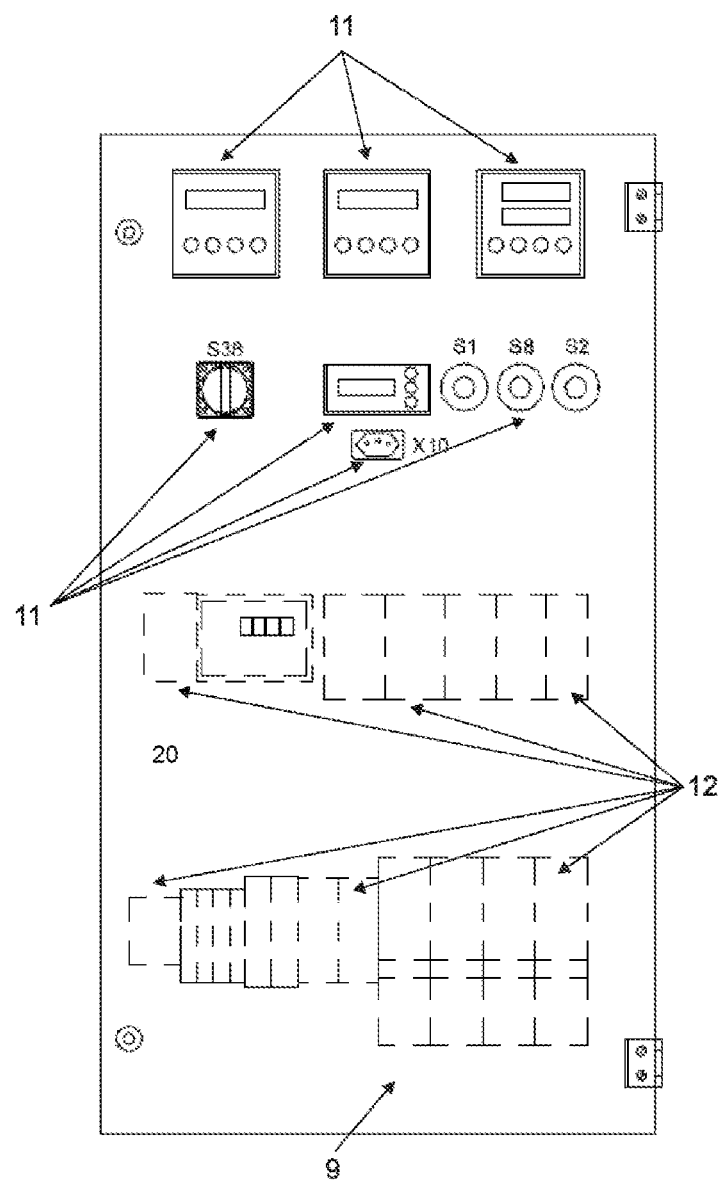
FIG. 5: Front view of the internal door of the enclosure of the integrated control, supervision and monitoring system.
Figure 6:
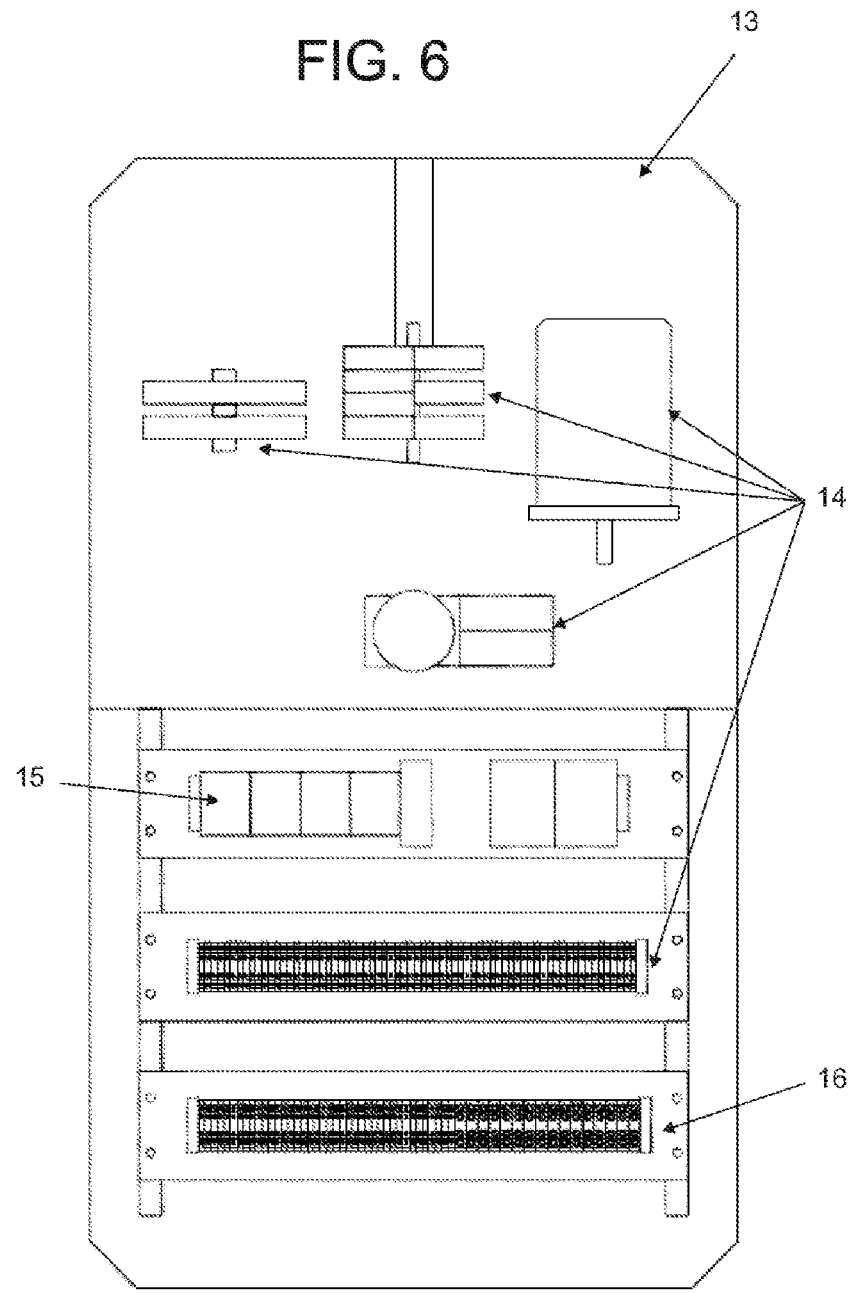
FIG. 6: Front view of the rear panel of the enclosure of the integrated control, supervision and monitoring system.
Figure 7:
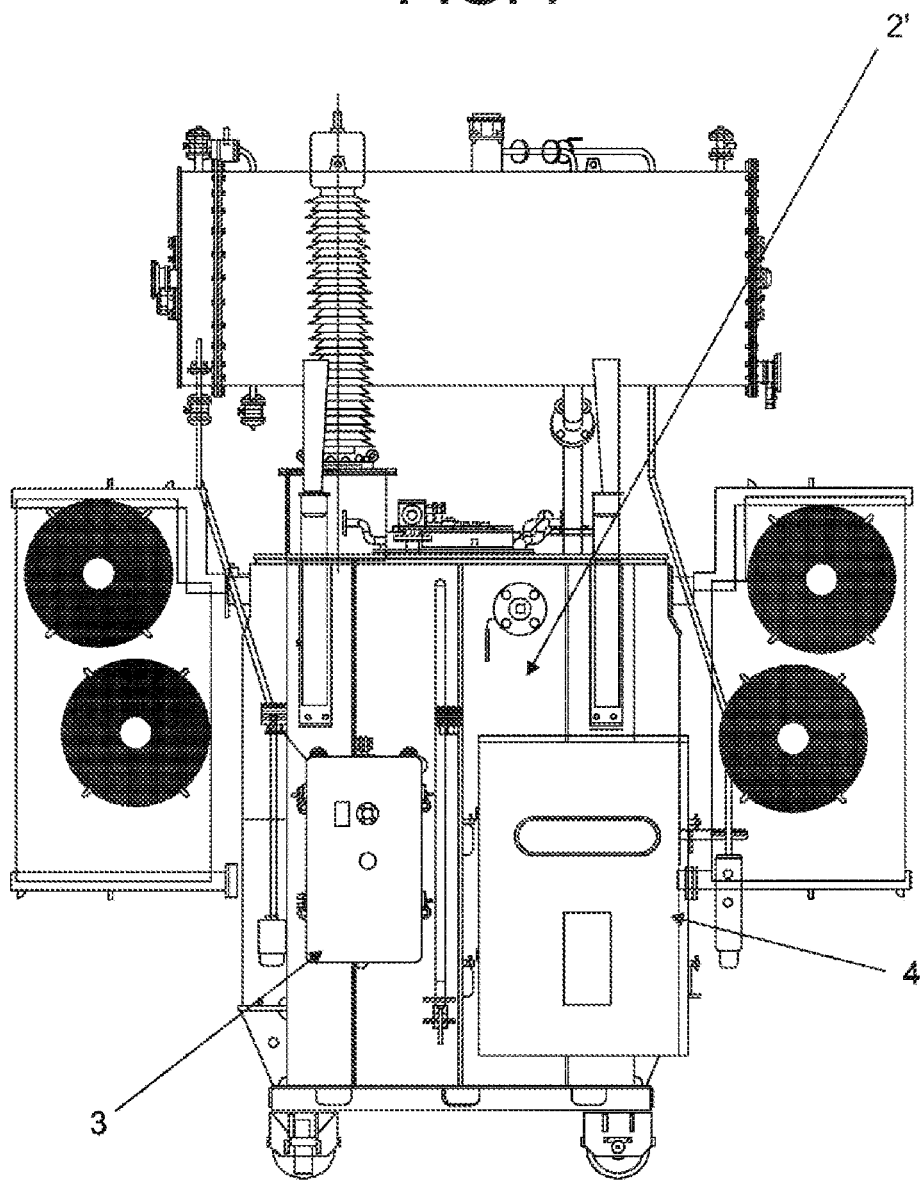
FIG. 7: Front view of a conventional transformer equipped with two enclosures, comprising an enclosure of the changer mechanism and a supervision and control enclosure.
Figure 8:
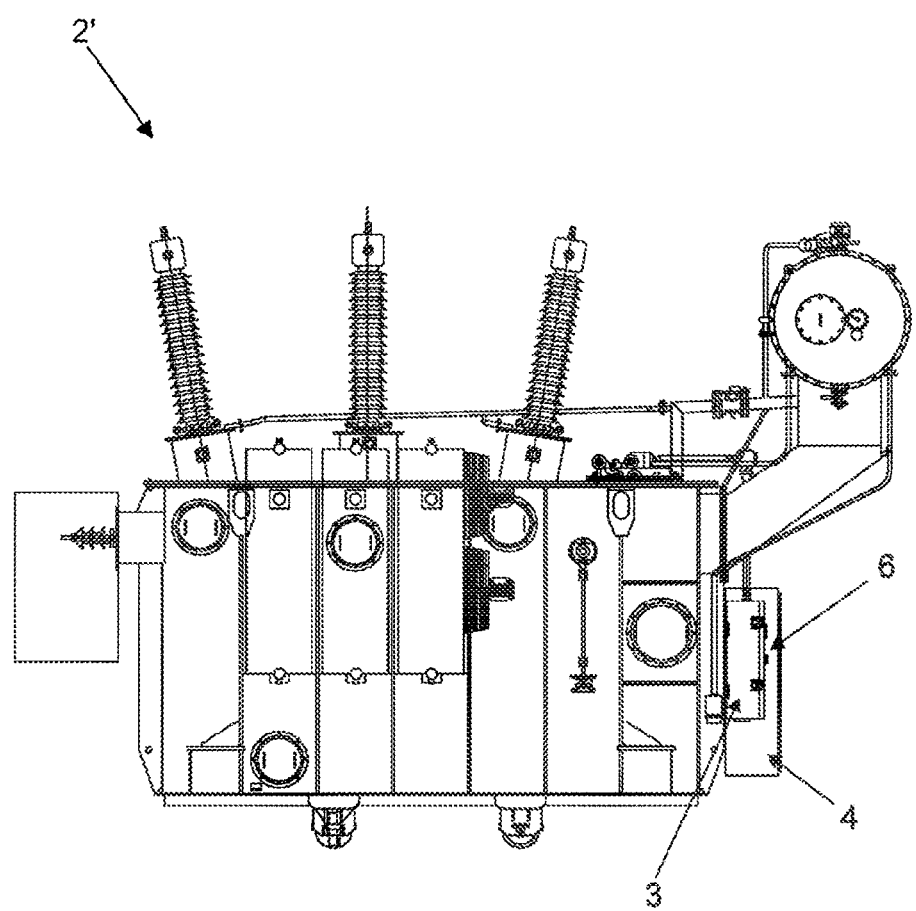
FIG. 8: Side view of a conventional transformer equipped with two enclosures, comprising an enclosure of the changer mechanism and a supervision and control enclosure.

The INTEGRATED CONTROL, SUPERVISION AND MONITORING SYSTEM FOR POWER TRANSFORMERS EQUIPPED WITH ON-LOAD TAP CHANGER SYSTEMS comprises a system capable of integrating, in a single enclosure (1), all the control, supervision and monitoring functions of power transformers (2) equipped with on-load tap changers, simplifying both the design and construction of conventional power transformers (2') using two enclosures (3), and 4), comprising a changer mechanism enclosure (3) and a supervision and control enclosure (4).

More specifically, the invented system (1) integrates into just one enclosure (1) all the functions originally performed by the changer mechanism enclosure (3) and the supervision and control enclosure (4) in order to free up a large area in the body of the power transformer (2) as shown in the hatched part (5) of FIG. 1. In one form of embodiment of the invention, the system is effected through an integrated enclosure (1), which is based on the enclosure (3) of the original changer mechanism, whose door (6), in a practically flat standard format, is replaced by an external door (7) possessing additional depth (8) sufficient to house the components, connectors and other devices necessary for the aggregation of all the functions performed by the old control and supervision enclosure (4) in the now integrated enclosure (1). In a more detailed manner, thanks to the extra depth (8) created by the external door (7) it was possible to install an internal door (9), duly separated from the edge (10) of the closure of the body of the integrated enclosure (1), where most of the devices (11) are installed which, in the conventional transformer with two enclosures, were packed into the supervision and control enclosure (4), which, as previously stated in this patent application is integrated into just one enclosure (1). The internal door (9), in addition to supporting the devices (11) visible on its front face, also anchors other supervision and control devices (12) on its rear side which are, thus, hidden when the inner door is closed (9). The integrated enclosure (1) also possesses on its rearmost portion a panel (13) that supports the original devices (14) of the enclosure (3) of the normal and/or conventional changer mechanism, such as the electric motor (17), the various mechanical gears (18), the electric switches activated by cams (19), the control circuit (20) and the connectors (21). However, in this invention the panel (13) provides support to other devices (15) and connectors (16) which, in the conventional transformer (2') with two enclosures (3 and 4), were packed into the supervision and control enclosure (4).

The invention claimed is:

1. INTEGRATED CONTROL, SUPERVISION AND MONITORING SYSTEM FOR POWER TRANSFORMERS EQUIPPED WITH ON-LOAD TAP CHANGERS, wherein it comprises control, supervision and monitoring functions of power transformers (2) disposed within a single enclosure (1), wherein the power transformers (2) are equipped with on-load tap changers and devices (14) of the on-load changer drive mechanism, the devices (14) comprising an electric motor (17), mechanical gears (18), electric switches driven by cams (19), control circuit (20) and connectors (21), the enclosure (1) further comprising control and monitoring devices (11, 12) of the power transformer (2), the monitoring devices (11, 12) comprising power and control components, forced cooling fans and/or pumps, electronic devices for online monitoring the state of the transformer, electronic devices for controlling the on-load tap changer, automatic voltage regulation and parallel operation control of the transformers (2) and connectors of auxiliary protection and supervision devices of the transformer (2) and secondary current transformers, wherein an additional enclosure (3) of a changer mechanism may be used as a mold for manufacturing the integrated enclosure (1), wherein an external door (7) creates an additional depth (8) in the enclosure (1), such additional depth (8) allowing installing an internal door (9), such internal door (9) receiving on its front and back faces the devices (14), connectors, supervision, control and monitoring devices (11, 12) of the transformer (2); the integrated enclosure (1) further comprising a rear panel (13) in its interior, the rear panel (13) supporting the devices (14), the other devices (15) and connectors (16, 21).

\* \* \* \* \*